(12) United States Patent
Aoki et al.

(10) Patent No.: US 8,614,264 B2
(45) Date of Patent: Dec. 24, 2013

(54) AQUEOUS INK COMPOSITION, INK JET RECORDING METHOD AND RECORDED MATERIAL

(75) Inventors: Katsuko Aoki, Kiso-machi (JP); Hiroshi Mukai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 12 days.

(21) Appl. No.: 13/016,225

(22) Filed: Jan. 28, 2011

(65) Prior Publication Data
US 2011/0183124 A1 Jul. 28, 2011

(30) Foreign Application Priority Data
Jan. 28, 2010 (JP) .................................. 2010-016690

(51) Int. Cl.
*C09D 11/02* (2006.01)
(52) U.S. Cl.
USPC ..... 523/160; 523/161; 428/195.1; 106/31.86; 106/31.78; 106/31.75; 427/256
(58) Field of Classification Search
USPC ........................................................ 523/160
See application file for complete search history.

(56) References Cited

U.S. PATENT DOCUMENTS

| | | |
|---|---|---|
| 3,582,487 A | 6/1971 | Fuhr et al. |
| 3,607,693 A | 9/1971 | Heine et al. |
| 3,720,635 A | 3/1973 | Metzner et al. |
| 3,929,693 A | 12/1975 | Hochberg |
| 4,007,144 A | 2/1977 | Sanders et al. |
| 4,129,486 A | 12/1978 | Deutsch et al. |
| 4,133,793 A | 1/1979 | Lewis et al. |
| 4,190,602 A | 2/1980 | Brunisholz et al. |
| 4,233,195 A | 11/1980 | Mills |
| 4,239,866 A | 12/1980 | Reitel et al. |
| 4,239,966 A | 12/1980 | Wang |
| 4,308,400 A | 12/1981 | Felder et al. |
| 4,315,807 A | 2/1982 | Felder et al. |
| 4,318,791 A | 3/1982 | Felder et al. |
| 4,320,186 A | 3/1982 | Kato et al. |
| 4,321,118 A | 3/1982 | Felder et al. |
| 4,347,111 A | 8/1982 | Gehlhaus et al. |
| 4,370,379 A | 1/1983 | Kato et al. |
| 4,450,279 A | 5/1984 | Shirosaki et al. |
| 4,477,681 A | 10/1984 | Gehlhaus et al. |
| 4,507,466 A | 3/1985 | Tomalia et al. |
| 4,522,693 A | 6/1985 | Henne et al. |
| 4,558,120 A | 12/1985 | Tomalia et al. |
| 4,568,737 A | 2/1986 | Tomalia et al. |
| 4,587,329 A | 5/1986 | Tomalia et al. |
| 4,631,337 A | 12/1986 | Tomalia et al. |
| 4,694,064 A | 9/1987 | Tomalia et al. |
| 4,721,734 A | 1/1988 | Gehlhaus et al. |
| 4,830,902 A | 5/1989 | Plantenga et al. |
| 4,922,004 A | 5/1990 | Kohler et al. |
| 5,041,516 A | 8/1991 | Frechet et al. |
| 5,077,402 A | 12/1991 | Desobry et al. |
| 5,212,212 A | 5/1993 | Fonda |
| 5,221,334 A | 6/1993 | Ma et al. |
| 5,281,682 A | 1/1994 | Cornforth et al. |
| 5,453,121 A | 9/1995 | Nicholls et al. |
| 5,609,671 A | 3/1997 | Nagasawa |
| 5,623,001 A | 4/1997 | Figov |
| 5,662,736 A | 9/1997 | Sakai et al. |
| 5,662,738 A | 9/1997 | Schmid et al. |
| 5,690,723 A | 11/1997 | Sano et al. |
| 5,846,306 A | 12/1998 | Kubota et al. |
| 5,903,290 A | 5/1999 | Nicoloff, Jr. et al. |
| 5,928,419 A | 7/1999 | Uemura et al. |
| 5,952,401 A | 9/1999 | Kimura et al. |
| 5,958,121 A | 9/1999 | Lin |
| 5,976,233 A | 11/1999 | Osumi et al. |
| 6,030,441 A | 2/2000 | Kubota et al. |
| 6,087,416 A | 7/2000 | Pearlstine et al. |
| 6,114,404 A | 9/2000 | Deeken et al. |
| 6,117,606 A | 9/2000 | Macholdt et al. |
| 6,123,759 A | 9/2000 | Mise et al. |
| 6,136,286 A | 10/2000 | Okuyama et al. |
| 6,179,415 B1 | 1/2001 | Okazaki et al. |
| 6,187,897 B1 | 2/2001 | Kawashima et al. |
| 6,300,388 B1 | 10/2001 | Verdonck et al. |
| 6,322,188 B1 | 11/2001 | Sano |

(Continued)

FOREIGN PATENT DOCUMENTS

| | | |
|---|---|---|
| CN | 1086637 C | 6/2002 |
| CN | 1398724 A | 2/2003 |

(Continued)

OTHER PUBLICATIONS

European Search Report of related European Application No. 11152226 dated May 11, 2011.
[No Author Listed] Ciba DAROCUR EDB. Photoinitiator. Ciba Specialty Chemicals, Inc., Coating Effects. Feb. 20, 2003. 2 pages.
[No Author Listed] Ciba IRGACURE 369. Photoinitiator. Ciba Specialty Chemicals, Inc., Coating Effects Segment. Sep. 4, 2001. 3 pages.
[No Author Listed] Ciba IRGACURE 819. Photoinitiator. Ciba Specialty Chemicals Inc., Coating Effects Segment. Aug. 30, 2001, 3 pages.

(Continued)

*Primary Examiner* — Doris Lee
(74) *Attorney, Agent, or Firm* — Nutter McClennen & Fish LLP; John J. Penny, V.; Christopher A. Potts

(57) ABSTRACT

An ink jet recording method includes ejecting droplets of an aqueous ink composition on an ink-non-absorbent or ink-low-absorbent recording medium from an ink jet recording apparatus, and drying the aqueous ink composition on the recording medium by heating the recording medium to 40° C. or more. The aqueous ink composition used in the method contains a pigment, a first solvent and a second solvent, but does not contain glycerol. The first solvent content W'is in the range of 3% to 6% by mass, and the ratio W2/W1 of the second solvent content W2 to the first solvent content W1 is 2 or more.

4 Claims, No Drawings

(56) References Cited

U.S. PATENT DOCUMENTS

| | | |
|---|---|---|
| 6,331,111 B1 | 12/2001 | Cao |
| 6,332,291 B1 | 12/2001 | Flosbach et al. |
| 6,341,841 B1 | 1/2002 | Shimada et al. |
| 6,395,079 B1 | 5/2002 | Sano |
| 6,419,733 B1 | 7/2002 | Sano et al. |
| 6,428,662 B1 | 8/2002 | Woodruff et al. |
| 6,433,038 B1 | 8/2002 | Tanabe et al. |
| 6,444,019 B1 | 9/2002 | Zou et al. |
| 6,488,751 B1 | 12/2002 | Takemoto |
| 6,491,748 B2 | 12/2002 | Watanabe |
| 6,518,370 B2 | 2/2003 | Abuelyaman et al. |
| 6,558,460 B1 | 5/2003 | Walker et al. |
| 6,558,753 B1 | 5/2003 | Ylitalo et al. |
| 6,602,333 B2 | 8/2003 | Miyabayashi |
| 6,637,850 B2 | 10/2003 | Shimada et al. |
| 6,653,367 B2 | 11/2003 | Miyabayashi |
| 6,654,367 B1 | 11/2003 | Kaufman |
| 6,664,306 B2 | 12/2003 | Gaddam et al. |
| 6,726,756 B1 | 4/2004 | Zou et al. |
| 6,793,313 B1 | 9/2004 | Adachi et al. |
| 6,793,318 B2 | 9/2004 | Saksa |
| 6,846,074 B2 | 1/2005 | Hirai |
| 6,846,851 B2 | 1/2005 | Nakhmanovich et al. |
| 6,849,110 B2 | 2/2005 | Sano |
| 6,869,470 B2 | 3/2005 | Kato |
| 6,877,851 B2 | 4/2005 | Watanabe |
| 6,890,049 B2 | 5/2005 | Shimada et al. |
| 6,924,327 B2 | 8/2005 | Sano et al. |
| 6,989,054 B2 | 1/2006 | Tanabe et al. |
| 7,008,475 B2 | 3/2006 | Randler et al. |
| 7,025,449 B2 | 4/2006 | Simons et al. |
| 7,040,747 B2 | 5/2006 | Kubota et al. |
| 7,064,153 B2 | 6/2006 | Bruck |
| 7,156,909 B2 | 1/2007 | Oyanagi et al. |
| 7,259,100 B2 | 8/2007 | Zurcher et al. |
| 7,285,592 B2 | 10/2007 | Harz et al. |
| 7,296,883 B2 | 11/2007 | Kanaya et al. |
| 7,303,619 B2 | 12/2007 | Oyanagi |
| 7,348,128 B2 | 3/2008 | Yamada et al. |
| 7,384,472 B2 | 6/2008 | Schweikart et al. |
| 7,419,255 B2 | 9/2008 | Kawaguchi et al. |
| 7,438,405 B2 | 10/2008 | Ichizawa et al. |
| 7,513,945 B2 | 4/2009 | Nakano et al. |
| 7,538,144 B2 | 5/2009 | Vanmaele et al. |
| 7,581,829 B2 | 9/2009 | Oyanagi et al. |
| 7,591,889 B2 | 9/2009 | Stoffel et al. |
| 7,604,693 B2 | 10/2009 | Oyanagi et al. |
| 7,619,015 B2 | 11/2009 | Oyanagi et al. |
| 7,670,418 B2 | 3/2010 | Kato et al. |
| 7,732,505 B2 | 6/2010 | Kito et al. |
| 7,753,514 B2 | 7/2010 | Nakano et al. |
| 7,790,245 B2 | 9/2010 | Oyanagi et al. |
| 7,828,888 B2 | 11/2010 | Itano et al. |
| 7,846,246 B2 | 12/2010 | Oyanagi et al. |
| 7,850,280 B2 | 12/2010 | Oyanagi et al. |
| 7,854,798 B2 | 12/2010 | Udagawa et al. |
| 7,855,041 B2 | 12/2010 | Weber et al. |
| 7,866,807 B2 | 1/2011 | Makuta et al. |
| 7,968,621 B2 | 6/2011 | Oyanagi et al. |
| 8,044,116 B2 | 10/2011 | Idemura et al. |
| 8,227,539 B2 | 7/2012 | Oyanagi et al. |
| 2003/0003296 A1 | 1/2003 | Dries et al. |
| 2003/0017353 A1 | 1/2003 | Yamaguchi et al. |
| 2003/0050379 A1 | 3/2003 | Shih et al. |
| 2003/0089271 A1 | 5/2003 | Hirano et al. |
| 2003/0144377 A1 | 7/2003 | Sano et al. |
| 2003/0153649 A1 | 8/2003 | Bromberg |
| 2003/0157356 A1 | 8/2003 | Tamura et al. |
| 2003/0176566 A1 | 9/2003 | Wight et al. |
| 2003/0222959 A1 | 12/2003 | Yamanouchi et al. |
| 2003/0231234 A1 | 12/2003 | Ushirogouchi et al. |
| 2004/0021753 A1 | 2/2004 | Yoshihiro et al. |
| 2004/0069183 A1 | 4/2004 | Kamoto et al. |
| 2004/0257419 A1 | 12/2004 | Iinuma et al. |
| 2004/0266907 A1 | 12/2004 | Sugita et al. |
| 2005/0039631 A1 | 2/2005 | Best et al. |
| 2005/0158524 A1 | 7/2005 | Sloat et al. |
| 2005/0159501 A1 | 7/2005 | Kiefer-Liptak |
| 2005/0176841 A1 | 8/2005 | Krohn |
| 2005/0176847 A1 | 8/2005 | Cagle |
| 2005/0197418 A1 | 9/2005 | Graziano et al. |
| 2005/0197419 A1 | 9/2005 | Graziano et al. |
| 2005/0282930 A1 | 12/2005 | Fu et al. |
| 2006/0009546 A1 | 1/2006 | Brown |
| 2006/0014849 A1 | 1/2006 | Vanmaele et al. |
| 2006/0014850 A1 | 1/2006 | Vanmaele et al. |
| 2006/0036001 A1 | 2/2006 | Oyanagi et al. |
| 2006/0078695 A1 | 4/2006 | Sen et al. |
| 2006/0092254 A1 | 5/2006 | Claes et al. |
| 2006/0158493 A1 | 7/2006 | Nakano et al. |
| 2006/0160917 A1 | 7/2006 | Oyanagi et al. |
| 2006/0187285 A1 | 8/2006 | Oyanagi et al. |
| 2006/0189712 A1 | 8/2006 | Kondo |
| 2006/0211788 A1 | 9/2006 | Krohn |
| 2006/0229382 A1 | 10/2006 | Schweikart et al. |
| 2006/0268084 A1 | 11/2006 | Nishizaki et al. |
| 2007/0022547 A1 | 2/2007 | O'Brien |
| 2007/0031615 A1 | 2/2007 | Nair et al. |
| 2007/0037961 A1 | 2/2007 | Oyanagi et al. |
| 2007/0044684 A1 | 3/2007 | Nakano et al. |
| 2007/0046720 A1 | 3/2007 | Konno et al. |
| 2007/0060670 A1 | 3/2007 | Ellis |
| 2007/0076069 A1 | 4/2007 | Edwards et al. |
| 2007/0120926 A1 | 5/2007 | Doumaux et al. |
| 2007/0129457 A1 | 6/2007 | Nakano et al. |
| 2007/0142501 A1 | 6/2007 | Oyanagi et al. |
| 2007/0148585 A1 | 6/2007 | Kaneko et al. |
| 2007/0222811 A1 | 9/2007 | Yanagi |
| 2007/0224345 A1 | 9/2007 | Metz et al. |
| 2007/0249750 A1 | 10/2007 | Oyanagi et al. |
| 2007/0281141 A1 | 12/2007 | Kohlweyer |
| 2008/0022893 A1 | 1/2008 | Mizutani |
| 2008/0024577 A1 | 1/2008 | Nakano et al. |
| 2008/0028980 A1 | 2/2008 | Aoki et al. |
| 2008/0081119 A1 | 4/2008 | Oyanagi et al. |
| 2008/0090931 A1 | 4/2008 | Nagvekar et al. |
| 2008/0096998 A1 | 4/2008 | Oyanagi et al. |
| 2008/0098928 A1 | 5/2008 | Oyanagi et al. |
| 2008/0125511 A1 | 5/2008 | Nakano et al. |
| 2008/0132599 A1 | 6/2008 | Nakano et al. |
| 2008/0145628 A1 | 6/2008 | Oyanagi et al. |
| 2008/0146689 A1 | 6/2008 | Oyanagi et al. |
| 2008/0152825 A1 | 6/2008 | Mukai et al. |
| 2008/0152828 A1 | 6/2008 | Mukai et al. |
| 2008/0152877 A1 | 6/2008 | Mukai et al. |
| 2008/0173214 A1 | 7/2008 | Oyanagi et al. |
| 2008/0182083 A1 | 7/2008 | Oyanagi et al. |
| 2008/0182085 A1 | 7/2008 | Oyanagi et al. |
| 2008/0207805 A1 | 8/2008 | Blease et al. |
| 2008/0213518 A1 | 9/2008 | Oyanagi et al. |
| 2008/0233362 A1 | 9/2008 | Kato et al. |
| 2008/0250970 A1 | 10/2008 | Oyanagi et al. |
| 2008/0308004 A1 | 12/2008 | Deroover et al. |
| 2009/0053415 A1 | 2/2009 | Isobe |
| 2009/0075036 A1 | 3/2009 | Itano et al. |
| 2009/0099277 A1 | 4/2009 | Nagvekar et al. |
| 2009/0110827 A1 | 4/2009 | Nakano et al. |
| 2009/0142555 A1 | 6/2009 | Sano et al. |
| 2009/0169834 A1 | 7/2009 | Sano et al. |
| 2009/0208651 A1 | 8/2009 | Oyanagi et al. |
| 2009/0214833 A1 | 8/2009 | Oyanagi et al. |
| 2009/0220695 A1 | 9/2009 | Oyanagi et al. |
| 2009/0233064 A1 | 9/2009 | Yatake et al. |
| 2009/0246479 A1 | 10/2009 | Mukai et al. |
| 2009/0280265 A1 | 11/2009 | Oyanagi et al. |
| 2009/0289973 A1 | 11/2009 | Makuta et al. |
| 2009/0295847 A1 | 12/2009 | Mukai et al. |
| 2010/0009136 A1 | 1/2010 | Oyanagi et al. |
| 2010/0086690 A1 | 4/2010 | Aoki |
| 2010/0086691 A1 | 4/2010 | Mukai et al. |
| 2010/0092674 A1 | 4/2010 | Mukai et al. |
| 2010/0092675 A1 | 4/2010 | Aoki |
| 2011/0014440 A1 | 1/2011 | Itano et al. |
| 2011/0036266 A1 | 2/2011 | Oyanagi et al. |

(56) References Cited

U.S. PATENT DOCUMENTS

| | | |
|---|---|---|
| 2011/0183125 A1 | 7/2011 | Aoki et al. |
| 2011/0287236 A1 | 11/2011 | Nakano et al. |
| 2012/0006224 A1 | 1/2012 | Oyanagi et al. |

FOREIGN PATENT DOCUMENTS

| | | |
|---|---|---|
| CN | 1529740 A | 9/2004 |
| CN | 1721462 A | 1/2006 |
| CN | 1771307 A | 5/2006 |
| DE | 10 200 502 1160 A1 | 11/2006 |
| EP | 0 040 721 A2 | 12/1981 |
| EP | 0 042 567 A2 | 12/1981 |
| EP | 0 192 167 A1 | 8/1986 |
| EP | 0 284 561 A2 | 9/1988 |
| EP | 0 333 224 A2 | 9/1989 |
| EP | 0 352 821 A1 | 1/1990 |
| EP | 0 372 778 A1 | 6/1990 |
| EP | 0 400 721 A2 | 12/1990 |
| EP | 0894835 A2 | 3/1999 |
| EP | 0 997 507 A1 | 5/2000 |
| EP | 1 045 013 A1 | 10/2000 |
| EP | 1 260 563 A1 | 11/2002 |
| EP | 1295916 A1 | 3/2003 |
| EP | 1 422 072 A1 | 5/2004 |
| EP | 1 452 569 A1 | 9/2004 |
| EP | 1 614 730 A1 | 1/2006 |
| EP | 1 616 920 A1 | 1/2006 |
| EP | 1 616 921 A1 | 1/2006 |
| EP | 1 674 499 A1 | 6/2006 |
| EP | 1 752 504 A1 | 2/2007 |
| EP | 1 806 387 A1 | 7/2007 |
| EP | 1 815 978 A1 | 8/2007 |
| EP | 1 837 381 A1 | 9/2007 |
| EP | 1 862 511 A1 | 12/2007 |
| EP | 1 892 105 A1 | 2/2008 |
| EP | 1 942 157 A2 | 7/2008 |
| EP | 1 942 158 A2 | 7/2008 |
| EP | 1 947 151 A1 | 7/2008 |
| EP | 1 950 260 A1 | 7/2008 |
| GB | 1 276 369 A | 6/1972 |
| GB | 1 547 283 A | 6/1979 |
| GB | 2 029 433 A | 3/1980 |
| GB | 2 172 655 A | 9/1986 |
| GB | 2 367 299 A | 4/2002 |
| JP | 47-003981 B | 2/1972 |
| JP | 47-006416 B | 2/1972 |
| JP | 47-022326 B | 6/1972 |
| JP | 47-023664 B | 7/1972 |
| JP | 56-28256 A | 3/1981 |
| JP | 57-030704 A | 2/1982 |
| JP | 59-042864 B2 | 10/1984 |
| JP | 60-026403 B | 6/1985 |
| JP | 60-026483 B | 6/1985 |
| JP | 61-194062 A | 8/1986 |
| JP | 62-001426 A | 1/1987 |
| JP | 62-081345 A | 4/1987 |
| JP | 63-061950 B2 | 11/1988 |
| JP | 01-034242 B2 | 7/1989 |
| JP | 01-238656 A | 9/1989 |
| JP | 02-009596 B2 | 3/1990 |
| JP | 02-009597 B2 | 3/1990 |
| JP | 02-211452 A | 8/1990 |
| JP | 356573 A | 3/1991 |
| JP | 3-79678 | 4/1991 |
| JP | 03160068 A | 7/1991 |
| JP | 03-216379 A | 9/1991 |
| JP | 4-18462 A | 1/1992 |
| JP | 05-186725 A | 7/1993 |
| JP | 62-01426 A | 7/1994 |
| JP | 07-258578 A | 10/1995 |
| JP | 08-003498 A | 1/1996 |
| JP | 08-218018 A | 8/1996 |
| JP | 08-283596 A | 10/1996 |
| JP | 08-295836 A | 11/1996 |
| JP | 10-110110 A | 4/1998 |
| JP | 10-110111 A | 4/1998 |
| JP | 10-110114 A | 4/1998 |
| JP | 10-120956 A | 5/1998 |
| JP | 10-120958 A | 5/1998 |
| JP | 10-195331 A | 7/1998 |
| JP | 10-195360 A | 7/1998 |
| JP | 10-237349 A | 9/1998 |
| JP | 10-287035 A | 10/1998 |
| JP | 10-330665 A | 12/1998 |
| JP | 11-011002 A | 1/1999 |
| JP | 11-165420 A | 6/1999 |
| JP | 11-193316 A | 7/1999 |
| JP | 11-202558 A | 7/1999 |
| JP | 11-343436 A | 12/1999 |
| JP | 2000-044858 A | 2/2000 |
| JP | 2000-044861 A | 2/2000 |
| JP | 2000-336295 A | 12/2000 |
| JP | 2000-345080 A | 12/2000 |
| JP | 2000-355667 A | 12/2000 |
| JP | 2001-348519 A | 12/2001 |
| JP | 2002-038063 A | 2/2002 |
| JP | 2002-179960 A | 6/2002 |
| JP | 2002-225414 A | 8/2002 |
| JP | 2002-249165 A | 9/2002 |
| JP | 2002-256189 A | 9/2002 |
| JP | 2002-529572 A | 9/2002 |
| JP | 2002-292775 A | 10/2002 |
| JP | 2002-332436 A | 11/2002 |
| JP | 2002-348513 A | 12/2002 |
| JP | 2003-012971 A | 1/2003 |
| JP | 2003-055463 A | 2/2003 |
| JP | 2003-055563 A | 2/2003 |
| JP | 2003-096337 A | 4/2003 |
| JP | 2003-147233 A | 5/2003 |
| JP | 2003-253148 A | 9/2003 |
| JP | 2003-292836 A | 10/2003 |
| JP | 2003-292857 A | 10/2003 |
| JP | 2003-306625 A | 10/2003 |
| JP | 2003-311945 A | 11/2003 |
| JP | 2003-342499 A | 12/2003 |
| JP | 2004-009359 A | 1/2004 |
| JP | 2004-009360 A | 1/2004 |
| JP | 2004-018716 A | 1/2004 |
| JP | 2004-059857 A | 2/2004 |
| JP | 2004-066817 A | 3/2004 |
| JP | 2004-099796 A | 4/2004 |
| JP | 2004-161852 A | 6/2004 |
| JP | 2004-174971 A | 6/2004 |
| JP | 2004-195797 A | 7/2004 |
| JP | 2004-197055 A | 7/2004 |
| JP | 2004-216654 A | 8/2004 |
| JP | 2004-250659 A | 9/2004 |
| JP | 2004-263139 A | 9/2004 |
| JP | 2004-264435 A | 9/2004 |
| JP | 2004-535506 A | 11/2004 |
| JP | 2004-535508 A | 11/2004 |
| JP | 2004-359960 A | 12/2004 |
| JP | 2005-007577 A | 1/2005 |
| JP | 2005-008690 A | 1/2005 |
| JP | 2005-015813 A | 1/2005 |
| JP | 2005-023284 A | 1/2005 |
| JP | 2005-023299 A | 1/2005 |
| JP | 2005-036079 A | 2/2005 |
| JP | 2005-60411 A | 3/2005 |
| JP | 2005-60419 A | 3/2005 |
| JP | 2005-068250 A | 3/2005 |
| JP | 2005-068251 A | 3/2005 |
| JP | 2005-068252 A | 3/2005 |
| JP | 2005-068439 A | 3/2005 |
| JP | 2005-096254 A | 4/2005 |
| JP | 2005-161583 A | 6/2005 |
| JP | 2005-187659 A | 7/2005 |
| JP | 2005-220352 A | 8/2005 |
| JP | 2005-290362 A | 10/2005 |
| JP | 2005-298757 A | 10/2005 |
| JP | 2005-314655 A | 11/2005 |
| JP | 2005-350551 A | 12/2005 |
| JP | 2005-536375 A | 12/2005 |

(56) References Cited

FOREIGN PATENT DOCUMENTS

| | | |
|---|---|---|
| JP | 2006-070255 A | 3/2006 |
| JP | 2006-117795 A | 5/2006 |
| JP | 2006-117931 A | 5/2006 |
| JP | 2006-123529 A | 5/2006 |
| JP | 2006-123542 A | 5/2006 |
| JP | 2006-137183 A | 6/2006 |
| JP | 2006-176734 A | 7/2006 |
| JP | 2006-199929 A | 8/2006 |
| JP | 2006-206875 A | 8/2006 |
| JP | 2006-241194 A | 9/2006 |
| JP | 2006-257302 A | 9/2006 |
| JP | 2006-257303 A | 9/2006 |
| JP | 2006-265292 A | 10/2006 |
| JP | 2006-265524 A | 10/2006 |
| JP | 2006-272933 A | 10/2006 |
| JP | 2006-274025 A | 10/2006 |
| JP | 2006-274029 A | 10/2006 |
| JP | 2006-281538 A | 10/2006 |
| JP | 2006-281568 A | 10/2006 |
| JP | 2006-281570 A | 10/2006 |
| JP | 2006-282822 A | 10/2006 |
| JP | 2006-282823 A | 10/2006 |
| JP | 2006-283017 A | 10/2006 |
| JP | 2006-523762 A | 10/2006 |
| JP | 2006-312711 A | 11/2006 |
| JP | 2007-016103 A | 1/2007 |
| JP | 2007-023161 A | 2/2007 |
| JP | 2007-045989 A | 2/2007 |
| JP | 2007-045990 A | 2/2007 |
| JP | 2007-046034 A | 2/2007 |
| JP | 2007-055084 A | 3/2007 |
| JP | 2007-100053 A | 4/2007 |
| JP | 2007-100054 A | 4/2007 |
| JP | 2007-112970 A | 5/2007 |
| JP | 2007-131741 A | 5/2007 |
| JP | 2007-138084 A | 6/2007 |
| JP | 2007-154087 A | 6/2007 |
| JP | 2007-169306 A | 7/2007 |
| JP | 2007-169307 A | 7/2007 |
| JP | 2007-169308 A | 7/2007 |
| JP | 2007-169451 A | 7/2007 |
| JP | 2007-182535 A | 7/2007 |
| JP | 2007-182536 A | 7/2007 |
| JP | 2007-191613 A | 8/2007 |
| JP | 2007-211036 A | 8/2007 |
| JP | 2007-254735 A | 10/2007 |
| JP | 2007-262272 A | 10/2007 |
| JP | 2007-269017 A | 10/2007 |
| JP | 2007-270085 A | 10/2007 |
| JP | 2007-297586 A | 11/2007 |
| JP | 2008-075067 A | 4/2008 |
| JP | 2008-138045 A | 6/2008 |
| JP | 2008-155523 A | 7/2008 |
| JP | 2008-155524 A | 7/2008 |
| JP | 2008-174712 A | 7/2008 |
| JP | 2009-113494 A | 5/2009 |
| JP | 2009-114454 A | 5/2009 |
| JP | 2009-242441 A | 10/2009 |
| JP | 2010-6062 A | 1/2010 |
| JP | 2010-90270 A | 4/2010 |
| JP | 2010-90271 A | 4/2010 |
| JP | 2010-94809 A | 4/2010 |
| JP | 2010-94852 A | 4/2010 |
| WO | 93/21235 A1 | 10/1993 |
| WO | 99/05230 A1 | 2/1999 |
| WO | 00/52530 A1 | 9/2000 |
| WO | 01/08895 A1 | 2/2001 |
| WO | 02/38687 A1 | 5/2002 |
| WO | 02/55619 A1 | 7/2002 |
| WO | 02/76764 A2 | 10/2002 |
| WO | 2004/018197 A1 | 3/2004 |
| WO | 2004/031308 A1 | 4/2004 |
| WO | 2004/052947 A1 | 6/2004 |
| WO | 2004/094534 A1 | 11/2004 |
| WO | 2004/104051 A1 | 12/2004 |
| WO | 2005/047405 A1 | 5/2005 |
| WO | 2005/061566 A1 | 7/2005 |
| WO | 2005/089957 A1 | 9/2005 |
| WO | 2005/095006 A1 | 10/2005 |
| WO | 2006/041004 A1 | 4/2006 |
| WO | 2006/085992 A2 | 8/2006 |
| WO | 2006/087930 A1 | 8/2006 |
| WO | 2006/098676 A1 | 9/2006 |
| WO | 2006/101054 A1 | 9/2006 |
| WO | 2006/112031 A1 | 10/2006 |
| WO | 2007/026355 A2 | 3/2007 |
| WO | 2007/026366 A1 | 3/2007 |
| WO | 2007/060264 A2 | 5/2007 |

OTHER PUBLICATIONS

[No Author Listed] Ciba IRGASTAB UV 22. Next gerneration in-can stabilizer for outstanding stabilization performance of UV inks and coatings. Ciba Specialty Chemicals Inc. 2006, 2 pages.

[No Author Listed] Dispersion. Definition. Hawley's Condensed Chemical Dictionary [Online]. 2007, 1 page. Retrieved Oct. 22, 2010.

[No Author Listed] Dispersion (chemistry). Definition. Wikipedia. Last Modified Oct. 22, 2010. 2 pages. Retrieved Oct. 25, 2010 from <http://en.wikipedia.org/w/index.php?title=Dispersion (chemistry) &printable=yes>.

[No Author Listed] IRGACURE 127. Photoinitiator. Ciba Specialty Chemicals Inc., Coating Effects Segment. Apr. 9, 2004, 4 pages.

[No Author Listed] Laromer UA 9029 V. Technical Information. BASF Aktiengesellschaft. EVP 009403 e, Rev. 0, Dec. 2003. 4 pages.

[No Author Listed] Organic Materials for Imaging, The Japanese Research Association for Organic Electronics Materials. Bunshin Publishing Co., p. 187-192 (1993).

[No Author Listed] BYK-UV 3500 BYK-UV 3510 BYK-UV 3530 BYK-UV-3570. Surface Additives for Radiation Curable Systems. BYK Additives & Instruments. Issue 7/08. BYK-Chemie GmbH, Germany. 4 pages.

Chatterjee et al., "Photochemistry of Carbocyanine Alkyltriphenylborate Salts: Intra-Ion Pair Electron Transfer and the Chemistry of Boranyl Radicals", Journal of American Chemistry Society, vol. 112, p. 6329-6338 (1990).

Chinese Office Action issued Nov. 30, 2010 for Application No. 200910004654.0 (11 Pages).

Davidson, R.S., "The Chemistry of Photoinitiators—some recent developments", Journal of Photochemistry and Photobiology A: Chemistry, vol. 73, p. 81-96 (1993).

Eaton, D.F., "One-electron Oxidation of Benzyltrialkylstannanes. 1. Cation Radical Fragmentation by Dual Modes", Journal of American Chemistry Society, vol. 102, p. 3278-3281 (1980).

Extended European Search Report issued Apr. 21, 2008 for Application No. 07024545.1 (5 Pages).

Extended European Search Report issued Dec. 29, 2008 in connection with European Application No. 08016440.3 (5 Pages).

Extended European Search Report issued Nov. 2, 2011 for Application No. 11177753.8 (6 Pages).

Fouassier, J.P., et al., "Radiation Curing in Polymer Science and Technology. vol. 1: Fundamentals and Methods," Elsevier Applied Science, vol. 1, p. 77-117 (1993).

"Fouassier, J.P., ""Photoinitiated Polymerisation—Theory and Applications""Rapra Review Reports, vol. 9, No. 4, p. 1-23 (1998)."

"Hawker et al., ""Preparation of Polymers with Controlled Molecular Architecture. A New Convergent Approach to Dendritic Macromolecules"", Journal of American Chemistry Society, vol. 112, p. 7638-7647 (1990)."

"Hawker et al., ""Hyperbranched Poly(ethylene glycol)s: A New Class of Ion-Conducting Materials"", Macromolecules, vol. 29, p. 3831-3838 (1996).".

International Search Report mailed Sep. 16, 2008 from Related International Application No. PCT/JP2008/064126. (2 pages).

Japanese Office Action issued Sep. 27, 2011 for Application No. 2006-201363.

Japanese Office Action issued May 25, 2011 for Application No. 2007-304874 (8 Pages).

Japanese Office Action issued Mar. 9, 2011 for Application No. 2007-316368 (9 Pages).

(56) References Cited

OTHER PUBLICATIONS

"Kim, Y.H., "'Highly Branched Aromatic Polymers Prepared by Single Step Syntheses'", Macromolecular Symposia, vol. 77, p. 21-33 (1994)."
Maslak, P, "Fragmentations by Photoinduced Electron Transfer. Fundamentals and Practical Aspects", Topics in Current Chemistry, vol. 168, p. 1-46 (1993).
Monroe et al., "Photoinitiators for Free-Radical-Initiated Photoimaging Systems", Chemical Reviews, vol. 93, p. 435-448 (1993).
Saeva, F.D., "Photoinduced Electron Transfer (PET) Bond Cleavage Reactions", Topics in Current Chemistry, vol. 156, p. 59-62 (1990).
Shirai et al., "Photoacid and Photobase Generators: Chemistry and Applications to Polymeric Materials", Prog. Polym. ScL, vol. 21, p. 1-45 (1996).
Step et al., Mechanism of polymer stabilization by hindered-amine light stabilizaers (HALS). Model investigations of the interaction of peroxy radicals with HALS amines and amino ethers. Marcomolecules. 1994;27:2529-2539.
U.S. Office Action issued Dec. 21, 2011 for U.S. Appl. No. 121074,308 (16 Pages).
U.S. Office Action issued Jun. 8, 2012 for U.S. Appl. No. 12/074,308 (25 Pages).
U.S. Non-final Office Action for U.S. Appl. No. 12/228,193, mailed Jun. 2, 2011.
U.S. Office Action for U.S. Appl. No. 12/228,193, mailed Oct. 14, 2011 (7 Pages).
U.S. Office Action for U.S. Appl. No. 12/228,193, mailed Mar. 8, 2012 (8 Pages).
U.S. Office Action for U.S. Appl. No. 12/228,224, issued Jun. 2, 2011 (13 Pages).
Notice of Allowance for U.S. Appl. No. 12/228,224, issued Oct. 20, 2011 (8 Pages).
U.S. Supplemental Notice of Allowance issued Jun. 28, 2012 for U.S. Appl. No. 12/228,224 (2 Pages).
U.S. Office Action issued Apr. 26, 2012 for U.S. Appl. No. 12/394,336 (13 Pages).
U.S. Office Action for U.S. Appl. No. 12/894,423 issued Nov. 10, 2011. (10 Pages).
U.S. Office Action issued May 29, 2012 for U.S. Appl. No. 12/894,423 (9 Pages).
U.S. Office Action issued Jan. 6, 2012 for U.S. Appl. No. 13/197,174 (8 Pages).
U.S. Office Action issued Dec. 12, 2011 for U.S. Appl. No. 13/240,667 (14 Pages).

AQUEOUS INK COMPOSITION, INK JET RECORDING METHOD AND RECORDED MATERIAL

BACKGROUND

1. Technical Field

The present invention relates to an aqueous ink composition, an ink jet recording method, and a recorded material.

2. Related Art

For recording on an ink-non-absorbent recording medium such as plastic films, non-aqueous ink compositions containing an organic solvent as a matrix have been conventionally used from the viewpoint of quick drying and preventing ink bleeding. On the other hand, aqueous ink compositions containing water as a solvent have been used in consideration of global environment and safety.

For an aqueous ink composition containing a yellow pigment as a color material, C. I. Pigment Yellow 74 may be used as the yellow pigment. However, C. I. Pigment Yellow 74 has insufficient light fastness. In order to enhance the light fastness, it has been suggested that C. I. Pigment Yellow 180 be substituted for C. I. Pigment Yellow 74.

Unfortunately, an aqueous ink composition containing C. I. Pigment Yellow 180 may be inferior in storage stability at low temperatures. When it is frozen by being stored at a low temperature of $-10°$ C. or less and is then thawed out, the pigment may be aggregated. For example, JP-A-2005-60411, JP-A-2005-60419 and JP-A-2007-154087 disclose that a moisturizing component such as glycerol is added to prevent the aqueous ink composition containing a yellow pigment from freezing. Some aqueous ink compositions containing a yellow pigment can have their low-temperature storage stability improved by adding glycerol or the like.

When an aqueous ink composition containing a yellow pigment is used to form an image on a plastic recording medium or the like, the composition comes into contact with other colors. This may cause bleeding in the image, resulting in a poor image. It is known that alkanediol or the like may be added to the aqueous ink composition to reduce the bleeding.

For example, JP-A-2007-154087 discloses that an aqueous ink composition containing 1,2-hexanediol or the like can form good uniform images in some cases of image recording.

However, if a moisturizing component such as glycerol is added to an aqueous ink composition containing C. I. Pigment Yellow 180, the aqueous ink composition may degrade the rub-fastness of the image formed on a plastic recording medium or the like, and good images may not be formed.

Also, if alkanediol or the like is added to an aqueous ink composition containing C. I. Pigment Yellow 180, the low-temperature storage stability of the aqueous ink composition may be degraded.

SUMMARY

An advantage of some aspects of the invention is that it provides an ink jet recording method capable of solving the above-described issues and forming images have a high rub-fastness with bleeding reduced on a specific recording medium while the aqueous ink composition ensures high storage stability at low temperatures and high ejection stability.

The following embodiments can solve at least some of the issues described above.

An ink jet recording method of an embodiment of the invention includes ejecting droplets of an aqueous ink composition not containing glycerol onto an ink-non-absorbent or ink-low-absorbent recording medium from an ink jet recording apparatus, and drying the aqueous ink composition on the recording medium by heating the recording medium to 40° C. or more. The aqueous ink composition contains a pigment containing C. I. Pigment Yellow 180, a first solvent in a content W1 of 3% to 6% by mass containing at least one of 1,2-hexanediol and 1,2-pentanediol, and a second solvent in a content W2 containing at least one solvent selected from the group consisting of 2-pyrrolidone, N-methyl-2-pyrrolidone, N,N'-dimethylpropyleneurea, 1,3-dimethyl-2-imidazolidinone, tetramethylurea, dimethyl sulfoxide, and hexamethylphosphoric acid triamide. The ratio W2/W1 of the second solvent content W2 to the first solvent content W1 is 2 or more.

The ink jet recording method can form an image having a high rub-fastness with bleeding reduced on an ink-non-absorbent or ink-low-absorbent recording medium while the aqueous ink composition ensures high storage stability at low temperatures and high ejection stability. Low temperatures mentioned herein refer to temperatures at which the aqueous ink composition can freeze, and more specifically to temperatures of $-10°$ C. or more.

The second solvent content W2 may be in the range of 6% to 25% by mass.

In the aqueous ink composition, the pigment content may be in the range of 1% to 10% by mass.

The aqueous ink composition may have a viscosity of 2 to 10 mPa·s at 20° C.

A recorded material of an embodiment of the invention is formed by the above ink jet recording method.

An aqueous ink composition of an embodiment of the invention is used in an ink jet recording method, and contains a pigment containing C. I. Pigment Yellow 180, a first solvent in a content W1 of 3% to 6% by mass containing at least one of 1,2-hexanediol and 1,2-pentanediol, and a second solvent in a content W2 containing at least one solvent selected from the group consisting of 2-pyrrolidone, N-methyl-2-pyrrolidone, N,N'-dimethylpropyleneurea, 1,3-dimethyl-2-imidazolidinone, tetramethylurea, dimethyl sulfoxide, and hexamethylphosphoric acid triamide, but does not contain glycerol. The ratio W1/W2 of the second solvent content W2 to the first solvent content W1 is 2 or more.

The aqueous ink composition can form an image having a high rub-fastness with bleeding reduced on an ink-non-absorbent or ink-low-absorbent recording medium while ensuring high storage stability at low temperatures and high ejection stability.

The ink jet recording method in which the aqueous ink composition is used may include ejecting droplets of the aqueous ink composition onto an ink-non-absorbent or ink-low-absorbent recording medium from an ink jet recording apparatus, and drying the aqueous ink composition on the recording medium by heating the recording medium to 40° C. or more.

DESCRIPTION OF EXEMPLARY EMBODIMENTS

Preferred embodiments of the invention will now be described. The embodiments disclosed below are illustrated as examples of the invention. The invention is not limited to the disclosed embodiments, and various modifications may be made within the scope and spirit of the invention.

1. INK JET RECORDING METHOD

An ink jet recording method of an embodiment of the invention includes ejecting droplets of an aqueous ink composition not containing glycerol onto an ink-non-absorbent or ink-low-absorbent recording medium from an ink jet recording apparatus, and drying the aqueous ink composition on the recording medium by heating the recording medium to 40° C. or more. The aqueous ink composition contains a pigment containing C. I. Pigment Yellow 180, a first solvent in a content W1 of 3% to 6% by mass containing at least one of 1,2-hexanediol and 1,2-pentanediol, and a second solvent in a content W2 containing at least one solvent selected from the group consisting of 2-pyrrolidone, N-methyl-2-pyrrolidone, N,N'-dimethylpropyleneurea, 1,3-dimethyl-2-imidazolidinone, tetramethylurea, dimethyl sulfoxide, and hexamethylphosphoric acid triamide. The ratio W2/W1 of the second solvent content W2 to the first solvent content W1 is 2 or more. The word "image" mentioned herein refers to a printed pattern defined by dots, including printed characters and solid shapes.

1. 1. Ink Jet Recording Operation

An ink jet recording method according to an embodiment of the invention includes ejecting droplets of an aqueous ink composition onto an ink-non-absorbent or ink-low-absorbent recording medium from an ink jet recording apparatus, and drying the aqueous ink composition on the recording medium by heating the recording medium to 40° C. or more.

The ink jet recording apparatus is not particularly limited as long as it can eject ink droplets onto a recording medium for recording. Preferably, the ink jet recording apparatus has the function of heating the recording medium during printing. The term "during printing" means a period of time from the time the ink jet recording apparatus has ejected ink droplets onto a recording medium until the ink is dried.

The function of heating the recording medium may be performed by a print heater that brings the recording medium into direct contact with a heat source for heating, or by a dryer that irradiates the recording medium with infrared rays or microwaves (electromagnetic waves having a maximum wavelength at about 2,450 MHz) or blows hot air over the recording medium without direct contact with the recording medium. The print heater and the dryer may be used singly or in combination. The combined use of a print heater and a dryer allows the control of drying temperature during printing.

Alternatively, ink droplets on the recording medium may be dried in a drying chamber or thermostatic chamber set to a predetermined temperature.

The recording medium is ink-non-absorbent or ink-low-absorbent, and hereinafter may be simply referred to as a plastic medium. The ink-non-absorbent recording medium may be a plastic film not surface-treated for ink jet printing (not having an ink-absorbing layer), or a paper sheet or any other medium coated or bonded with a plastic film. The plastic here may be, for example, polyvinyl chloride, polyethylene terephthalate, polycarbonate, polystyrene, polyurethane, polyethylene, or polypropylene. The ink-low-absorbent recording medium may be art paper, coated paper, or matte paper.

The ink-non-absorbent and ink-low-absorbent recording media used herein are recording media that can absorb water in an amount of 10 mL/m$^2$ or less for a period of 30 ms$^{1/2}$ from the beginning of contact with water, measured by Bristow's method. Bristow's method is broadly used for measuring liquid absorption in a short time, and Japan Technical Association of the Pulp and Paper Industry (JAPAN TAPPI) has officially adopted this method. Details of this method are specified in Standard No. 51 of "JAPAN TAPPI Kami Pulp Shiken Hou 2000-nen Ban" (JAPAN TAPPI Pulp and Paper Test Methods, edited in 2000).

The ink jet recording method using an ink jet recording apparatus may be performed as below. First, droplets of an aqueous ink composition (described later) are ejected onto a plastic medium. An image is thus formed on the plastic medium. Any known technique can be used for ink jet ejection. In particular, superior image recording can be performed by a technique for ejecting droplets by vibration of a piezoelectric element (recording technique using an ink jet head that forms ink droplets by mechanical deformation of an electrostrictive element).

Subsequently, the aqueous ink composition on the plastic medium is dried by heating the plastic medium to 40° C. or more with a print heater or dryer of the ink jet recording apparatus. By this operation, the moisture or the like in the aqueous ink composition on the plastic medium is rapidly evaporated, so that resin particles (described later) in the aqueous ink composition form a coating. Consequently, a high-quality image not exhibiting ink bleeding or non-uniformity in density can be formed in a short time even on a plastic medium, and the coating of the resin particles adheres over the recording medium to fix the image.

The plastic medium is heated to 40° C. or more, preferably 40 to 80° C., and more preferably 40 to 60° C. By heating the plastic medium to 40° C. or more, the liquid medium in the aqueous ink composition can be efficiently evaporated. However, if the plastic medium is heated to more than 80° C., problems may occur depending on the material of the plastic medium.

The heating time of the plastic medium is not particularly limited as long as the liquid medium in the aqueous ink composition can be evaporated and the resin fixer can form a coating, and it can be appropriately set in view of the type of the liquid medium, the type of resin particles, and printing speed.

1. 2. Aqueous Ink Composition

An aqueous ink composition used in the ink jet recording method of an embodiment of the invention will now be described in detail.

1. 2. 1. Pigment

The aqueous ink composition contains C. I. Pigment Yellow 180 as a pigment. C. I. Pigment Yellow 180 is superior in light fastness, and can form high-quality images in combination with the below-described first solvent.

In general, C. I. Pigment Yellow 180 in an aqueous ink composition is liable to aggregate when the aqueous ink composition thaws out after being stored at a low temperature. On the other hand, the aqueous ink composition of the present embodiment has high storage stability at low temperatures, and the aggregation of C. I. Pigment Yellow 180 can be reduced by controlling the composition as described later, even when the aqueous ink composition thaws out after being stored at a low temperature.

The content of C. I. Pigment Yellow 180 in the aqueous ink composition is preferably in the range of 1% to 10% by mass, and more preferably in the range of 3% to 7% by mass. These ranges allow C. I. Pigment Yellow 180 to disperse sufficiently in the aqueous ink composition and to form an image having a satisfactory color on a plastic medium.

1. 2. 2. Solvent

The aqueous ink composition further contains a first solvent and a second solvent.

The first solvent contains at least one of 1,2-hexanediol and 1,2-pentanediol. These materials can enhance the wettability of the aqueous ink composition to plastic media and, thus, have the function of uniformly wetting plastic media. Accordingly, ink bleeding and similar problems can be reduced in images formed on plastic media.

The first solvent content (W1) in the aqueous ink composition is in the range of 3% to 6% by mass. This range of the first solvent content (W1) allows the ink composition to form a good image in which bleeding has been reduced. However, if the first solvent content (W1) is lower than the above range, ink bleeding can occur, and good images may not be formed. If the first solvent content (W1) is higher than the above range, the pigment of the aqueous ink composition may aggregate at low temperatures; hence, the storage stability may be degraded.

The second solvent contains at least one solvent selected from the group consisting of 2-pyrrolidone, N-methyl-2-pyrrolidone, N,N'-dimethylpropyleneurea, 1,3-dimethyl-2-imidazolidinone, tetramethylurea, dimethyl sulfoxide, and hexamethylphosphoric acid triamide.

The second solvent is highly compatible with the first solvent, and can enhance the low-temperature storage stability of the aqueous ink composition. The second solvent can hinder the increase in the viscosity of the aqueous ink composition and the aggregation of the pigment when the frozen aqueous ink composition thaws out. Accordingly, the aqueous ink composition can be stably ejected even if it has been frozen and subsequently thawed before use.

The second solvent content (W2) in the aqueous ink composition is preferably in the range of 6% to 25% by mass. By controlling the second solvent content (W2) in this range, the resulting aqueous ink composition can exhibit high storage stability at low temperatures. However, if the second solvent content (W2) is lower than the above range, the aqueous ink composition may not be stably stored at a low temperature. If the second solvent content (W2) is more than the above range, images formed on a plastic medium may not be dried easily.

In the aqueous ink composition, the ratio (W2/W1) of the second solvent content (W2) to the first solvent content (W1) is 2 or more, and preferably in the range of 2 to 8. This range allows the aqueous ink composition to be stored stably at low temperatures and ejected stably, and to form good images on a plastic medium with bleeding reduced.

When the solvent content ratio W2/W1 is 2 or more, the aqueous ink composition exhibits high storage stability at low temperatures. However, if the solvent content ratio W2/W1 is less than 2, the storage stability of the aqueous ink composition may be degraded. The viscosity of the aqueous ink composition can increase or the pigment can aggregate, during storage. In contrast, if the W2/W1 ratio exceeds 8, the aqueous ink composition can be stored stably at low temperatures, but may cause bleeding in the resulting image because the ink composition cannot be easily dried.

The aqueous ink composition used in the ink jet recording method of the present embodiment does not contain glycerol. Glycerol imparts a moisture-retaining property to the aqueous ink composition and enhances the low-temperature storage stability. Also, glycerol can reduce the drying speed of the aqueous ink composition to hinder the aqueous ink composition from clogging the nozzles of the ink jet recording apparatus, thus enhancing the ejection stability of the ink composition. However, if glycerol is added to an aqueous ink composition, the images formed of the ink composition on a plastic medium may not be easily dried, and the rub-fastness of the images may be reduced.

The aqueous ink composition used in the ink jet recording method of the present embodiment contains the first solvent and the second solvent in a ratio controlled in the above range, so that the ink composition can ensure the storage stability at low temperatures even though glycerol is not contained, and also can reduce the bleeding in the image on a plastic medium and form images having high rub-fastness.

1. 2. 3. Water

The aqueous ink composition used in the ink jet printing method of the present embodiment contains water. The water acts as the main medium of the aqueous ink composition, and is evaporated in the above-described drying operation.

Preferably, the water is pure water or ultra pure water from which ionic impurities have been removed as much as possible, such as ion exchanged water, ultrafiltered water, reverse osmosis water, or distilled water. Preferably, sterile water prepared by, for example, UV irradiation or addition of hydrogen peroxide is used. The use of sterile water can prevent the occurrence of mold or bacteria in the pigment dispersion or the aqueous ink composition over the long time.

1. 2. 4. Other Constituents

The aqueous ink composition may further contain resin particles, a resin dispersant, a silicone surfactant, a pH adjuster, a preservative or fungicide, an anticorrosive, a chelating agent and other additives.

The resin particles solidify the image formed on a plastic medium and firmly fix the image to the plastic medium. In the aqueous ink composition used in the ink jet recording method of the present embodiment, preferably, the resin particles are in a state of emulsion or suspension. The use of the resin particles in an emulsion or a suspension makes it easy to control the viscosity of the aqueous ink composition in a range appropriate for the ink jet recording method. Accordingly, the aqueous ink composition can exhibit high storage stability and high ejection stability.

The resin dispersant helps the pigment (C. I. Pigment Yellow 180) disperse stably in the aqueous ink composition.

The resin particles and the resin dispersant may contain, for example, a homopolymer or a copolymer of acrylic acid, acrylic ester, methacrylic acid, methacrylic ester, acrylonitrile, cyanoacrylate, acrylamide, olefin, styrene, vinyl acetate, vinyl chloride, vinyl alcohol, vinyl ether, vinyl pyrrolidone, vinyl pyridine, vinyl carbazole, vinyl imidazole and vinylidene chloride, a fluorocarbon polymer, or a natural resin. If a copolymer is used, the copolymer may be a random copolymer, a block copolymer, an alternating copolymer, or a graft copolymer.

The resin particles may be prepared from a known material by a known method. For example, resin particles disclosed in JP-B-62-1426, JP-A-3-56573, JP-A-3-79678, JP-A-3-160068, or JP-A-4-18462 may be used. Commercially available resin particles may be used, such as Micro Gel E-1002 and Micro Gel E-5002 (produced by Nippon Paint), VONCOAT 4001 and VONCOAT 5454 (produced by DIC), SAE 1014 (produced by Nippon Zeon), Saivinol SK-200 (produced by Saiden Chemical Industry), and JONCRYL 7100, JONCRYL 390, JONCRYL 711, JONCRYL 511, JONCRYL 7001, JONCRYL 632, JONCRYL 741, JONCRYL 450, JONCRYL 840, JONCRYL 74J, JONCRYL HRC-1645J, JONCRYL 734, JONCRYL 852, JONCRYL 7600, JONCRYL 775, JONCRYL 537J, JONCRYL 1535, JONCRYL PDX-7630A, JONCRYL 352J, JONCRYL 352D, JONCRYL PDX-7145, JONCRYL 538J, JONCRYL 7640, JONCRYL 7641, JONCRYL 631, JONCRYL 790, JONCRYL 780 and JONCRYL 7610 (produced by BASF Japan).

The resin dispersant may be a commercial product such as JONCRYL 67, JONCRYL 678, JONCRYL 586, JONCRYL 611, JONCRYL 680, JONCRYL 682, JONCRYL 683, or JONCRYL 690 (each produced by BASF Japan).

The silicone surfactant helps the ink composition spread uniformly over the plastic medium, and thus prevents the non-uniformity of ink density and the ink bleeding. Preferably, the silicone surfactant content in the aqueous ink composition is 0.1% to 1.5% by mass. If the silicone surfactant content is less than 0.1% by mass, it is not easy for the ink composition to spread uniformly over the plastic medium. Consequently, non-uniformity in ink density and ink bleeding are liable to occur. If the silicone surfactant content is more than 1.5% by mass, on the other hand, the aqueous ink composition may not be stably stored or stably ejected.

Preferably, the silicone surfactant is a polysiloxane compound. For example, polyether-modified organosiloxane may be used. Commercially available silicone surfactants may be used, such as BYK-306, BYK-307, BYK-333, BYK-341, BYK-345, BYK-346 and BYK-348 (each produced by BYK), and KF-351A, KF-352A, KF-353, KF-354L, KF-355A, KF-615A, KF-945, KF-640, KF-642, KF-643, KF-6020, X-22-4515, KF-6011, KF-6012, KF-6015 and KF-6017 (each produced by Shin-Etsu Chemical).

Examples of the pH adjuster include potassium dihydrogenphosphate, sodium dihydrogenphosphate, sodium hydroxide, lithium hydroxide, potassium hydroxide, ammonia, diethanolamine, triethanolamine, triisopropanolamine, potassium carbonate, sodium carbonate, and sodium hydrogencarbonate.

Examples of the preservative and fungicide include sodium benzoate, sodium pentachlorophenol, sodium 2-pyridinethiol-1-oxide, sodium sorbate, sodium dehydroacetate, and 1,2-dibenzothiazoline-3-one. Commercially available preservatives and fungicides include Proxel XL2 and Proxel GXL (produced by Avecia), and Denicide CSA and NS-500W (produced by Nagase Chemtex).

The anticorrosive may be benzotriazole or the like.

Examples of the chelating agent include ethylenediaminetetraacetic acid and its salts, such as sodium dihydrogen ethylenediaminetetraacetate.

1. 2. 5. Properties

The aqueous ink composition used in the ink jet recording method of the present embodiment preferably has a viscosity of 2 to 10 mPa·s, more preferably 3 to 6 mPa·s, at 20° C. When the aqueous ink composition has a viscosity in the above range at 20° C., nozzles can eject an appropriate amount of aqueous ink composition in a droplet form, and the deviation or scattering of droplets can be reduced. Thus, such an aqueous ink composition is suitable for use in ink jet recording apparatuses. The viscosity of the aqueous ink composition can be measured with a vibration viscometer VM-100AL (manufactured by Yamaichi Electronics) with the aqueous ink composition kept at 20° C.

2. RECORDED MATERIAL

The recorded material according to an embodiment of the invention is a record formed by the above-described ink jet recording method. Since images are formed on a plastic medium with the above-described aqueous ink composition, the recorded material has a high-quality image having high rub-fastness in which the ink bleeding and other problems have been reduced.

3. EXAMPLES

The invention will be further described with reference to specific Examples. However, it is not limited to the Examples.

3. 1. Preparation of Pigment Dispersion

Aqueous ink compositions used in the Examples were liquid dispersions each in which a pigment was dispersed with a resin dispersant (hereinafter referred to as a pigment dispersion).

The pigment dispersion was prepared as below. First, ion exchanged water was added to 5.0 parts by mass of acrylic acid-acrylic ester copolymer (resin dispersant) and 20 parts by mass of C. I. Pigment Yellow 180 (pigment) to 100 parts by mass in total, and these materials were stirred into a mixture. The mixture was sufficiently blended for 6 hours in a sand mill (produced by Yasukawa Seisakusho) with zirconia beads of 1.5 mm in diameter. The zirconia beads were removed with a separator to yield a pigment dispersion.

In Comparative Example 4, C. I. Pigment Yellow 74 was used as the pigment, instead of C. I. Pigment Yellow 180, and the other constituents and procedure were the same as in the Examples.

3. 2. Preparation of Aqueous Ink Composition

Each composition shown in the Table was prepared by adding a first solvent, a second solvent, a silicon surfactant and ion exchanged water to the pigment dispersion. Then, each composition was stirred for 1 hour at room temperature, and filtered through a membrane filter of 5 μm in pore size to yield an aqueous ink composition.

In Comparative Example 3, glycerol was added to the liquid aqueous composition, and the other constituents and procedure were the same as in the Examples.

The constituents shown in the Table are as follows:
(1) Pigment
   C. I. Pigment Yellow 180
   C. I. Pigment Yellow 74
(2) First Solvent
   1,2-hexanediol
   1,2-pentanediol
(3) Second Solvent
   1,3-dimethyl-2-imidazolidinone
   N,N'-dimethylpropyleneurea
   2-pyrrolidone
   N-methyl-2-pyrrolidone
(4) Other solvent
   Glycerol
(5) Silicon Surfactant
   BYK-348 (produced by produced by BYK, polyether-modified siloxane)
(6) Resin dispersant
   Acrylic acid-acrylic ester copolymer
(7) Resin particles
   Styrene-acrylic acid copolymer 3. 3. Evaluation Tests 3. 3. 1. Storage Stability The aqueous ink composition was stored in a sample bottle in a completely sealed state at −20° C. for 3 days, and then further stored at 20° C. for 4 hours. After the storage, the viscosity of the aqueous ink composition at 20° C. and the particle size of the pigment were compared with those before the storage.

The viscosity was measured with a vibration viscometer VM-100AL (manufactured by Yamaichi Electronics) after the aqueous ink composition had been allowed to stand at 20° C. for 1 hour. For the particle size of the pigment, the average particle size was measured with a laser Doppler particle size distribution meter Microtrac UPA 150 (manufactured by Nikkiso).

The evaluation criteria were as follows:
(Viscosity Variation)
Good: viscosity varied in the range of more than −0.3 mPa·s and less than +0.3 mPa·s
Bad: viscosity varied by −0.3 mPa·s or less or +0.3 mPa·s or more
(Particle Size Variation)
Good: average particle size varied by less than 5%
Bad: average particle size varied by 15% or more

3. 3. 2. Bleeding (1) Preparation of Recorded Material

An ink jet printer PX-G930 (manufactured by Seiko Epson) was altered to be equipped at a paper guide with a heater capable of varying temperature so that the recording medium can be heated during recording.

The nozzle lines of the altered printer were charged with four color aqueous ink compositions of cyan (C), magenta (M), yellow (Y) and black (K). A solid pattern image was formed on a plastic medium "Cold Laminate Film PG-50L" (PET film, manufactured by Lami Corporation) at room temperature and normal pressure in such a manner that each of the C, M and K color compositions comes into contact with the Y color composition, and the solid pattern image was dried by heating the plastic medium to 45° C. by the heater provided at the paper guide portion. Subsequently, the plastic medium was placed in a dryer kept at 60° C. and the solid pattern image was further dried for 1 minute. A recorded material of the solid pattern image printed on the plastic medium was thus prepared.

The solid pattern image was formed so that it would have a vertical resolution of 720 dpi and a horizontal resolution of 720 dpi, and a duty of 50%. The word "duty" mentioned herein refers to the percentage of the segments to which ink had been applied. For example, when the resolution is 720 dpi by 720 dpi, it refers to the percentage of the segments to which ink had been applied in an area of 1 square inch divided into 518400 segments.

The Y color composition, or yellow ink composition, was the aqueous ink composition prepared according to "3. 2. Preparation of Aqueous Ink Composition".

The C, M and K color compositions were aqueous ink compositions prepared in the same manner as the yellow ink composition except that the following pigments were used instead of C. I. Pigment Yellow 180 in "3. 1. Preparation of Pigment Dispersion". Then, the pigment dispersions thus prepared were used to prepare the respective C, M and K aqueous ink compositions.

C (cyan ink composition): C. I. Pigment Blue 15:3
M (magenta ink composition): C. I. Pigment Red 122
K (black ink composition): C. I. Pigment Black 7

(2) Evaluation of Recorded Material

The contact portions of the Y color with the other colors (C, M and K) in the recorded material prepared in the above (1) were observed for bleeding.

The evaluation criteria were as follows:

Good: No bleeding was observed in the contact portions.
Bad: Bleeding was observed in a contact portion.

3. 3. 3. Ejection Stability (1) Preparation of Recorded Material

The nozzle liens of the ink jet printer PX-G930 used for the evaluation in "3. 3. 2. Bleeding" were charged with the aqueous ink composition prepared in "3. 2. Preparation of Aqueous Ink Composition". The aqueous ink composition was continuously ejected onto plain paper (for example, Fuji Xerox P paper) for 10 minutes without heating the plain paper, and it was confirmed that all the nozzles normally ejected the ink composition. Then, continuous printing was performed for a predetermined time to form a pattern with an average duty of 10% including characters and pictures on a plain paper heated to 45° C., thus producing a recorded material. The weight of ink ejected for each dot was set to 20 ng, and the resolution was set at 720 dpi in the vertical direction by 720 dpi in the horizontal direction.

(2) Evaluation of Recorded Material

The resulting recorded material was observed for dot missing and deviation. The deviation here refers to the displacement of the landing position of ink droplets on the recorded material.

The evaluation criteria were as follows:

Good: No dot missing or deviation was observed 1 hour after the start of printing.

Bad: A lot of dot missing or deviation was observed 1 hour after the stat of printing.

3. 3. 4. Rub-fastness (1) Preparation of Recorded Material

The nozzle lines of the ink jet printer PX-G930 used for the evaluation in "3. 3. 2. Bleeding" were charged with the aqueous ink composition (yellow ink composition) prepared in "3. 2. Preparation of Aqueous Ink Composition". A solid pattern image was formed on a plastic medium "Cold Laminate Film PG-50L" (PET film, manufactured by Lami Corporation) heated to 45° C. Subsequently, the plastic medium was allowed to stand in a dryer kept at 60° C. and the solid pattern image was further dried for 1 minute. A recorded material of the solid pattern image printed on the plastic medium was thus prepared. The solid pattern image was formed so that it would have a vertical resolution of 720 dpi and a horizontal resolution of 720 dpi, and a duty of 60%.

(2) Evaluation of Recorded Material

After being allowed to stand at 20° C. for 16 hours, the recorded material was subjected to a test with a Gakushin-type rubbing tester AB-301 (manufactured by Tester Sangyo) by observing the surface of the image after rubbing the recorded material against a rubber with a white cotton rubbing cloth 50 times at a load of 500 g.

The evaluation criteria were as follows:

Good: No flaw was observed at the surface of the image.
Bad: A large flaw was observed at the surface of the image.

3. 3. 5. Light Fastness (1) Preparation of Recorded Material

The nozzle lines of an ink jet printer PX-5500 (manufactured by Seiko Epson) were charge with the aqueous ink composition (yellow ink composition) prepared in "3. 2. Preparation of Aqueous Ink Composition". A recorded material was prepared by printing an solid image of 10 mm by 10 mm having an optical density (OD value) of 1.0 on a photographic paper KA420PSKR (glossy paper, manufactured by Seiko Epson) at room temperature and normal pressure.

(2) Evaluation of Recorded Material

The solid image portion of the resulting recorded material was exposed at a dose of 70000 Lux for 600 hours with Xenon Weather Meter XL75 (manufactured by Suga Test Instruments), and then the optical density (OD value) of the solid image portion was measured with GRETAG SPM-50 (manufactured by GretagMacbeth). The light fastness of the image was evaluated by the decrease of the OD value after exposure from the OD value before exposure.

The evaluation criteria were as follows:

Good: OD value decreased by less than 20%.
Bad: OD value decreased by 20% or more.

3. 4. Evaluation Results

The results of the above evaluations are shown in the Table.

TABLE

| | | Example 1 | Example 2 | Example 3 | Example 4 | Example 5 | Example 6 | Comparative Example 1 | Comparative Example 2 |
|---|---|---|---|---|---|---|---|---|---|
| Pigment (mass %) | C.I. Pigment Yellow 180 | 4.0 | 4.0 | 4.0 | 4.0 | 4.0 | 4.0 | 4.0 | 4.0 |
| | C.I. Pigment Yellow 74 | | | | | | | | |
| First solvent (mass %) | 1,2-hexanediol | 3.0 | 6.0 | 3.0 | | 6.0 | 3.0 | 3.0 | 6.0 |
| | 1,2-pentanediol | | | | 5.0 | | | | |
| Second solvent (mass %) | 1,3-dimethyl-2-imidazolidinone | 3.0 | 6.0 | | 5.0 | | 11.0 | 2.0 | 5.0 |
| | N,N'-dimethylpropyleneurea | | | 3.0 | | | | | |
| | 2-pyrrolidone | 3.0 | 6.0 | | 5.0 | 12.5 | 11.0 | 3.0 | 5.0 |
| | N-methyl-2-pyrrolidone | | | 7.5 | | 12.5 | | | |
| Other solvent (mass %) | Glycerol | | | | | | | | |
| Silicon surfactant (mass %) | polyether-modified siloxane | 0.5 | 0.5 | 0.5 | 0.5 | 0.5 | 0.5 | 0.5 | 0.5 |
| Resin dispersant (mass %) | Acrylic acid-acrylic ester copolymer | 1.0 | 1.0 | 1.0 | 1.0 | 1.0 | 1.0 | 1.0 | 1.0 |
| Resin particles (mass %) | Styrene-acrylic acid copolymer | 2.0 | 2.0 | 2.0 | 2.0 | 2.0 | 2.0 | 2.0 | 2.0 |
| Balance (mass %) | Ion exchanged water | 83.5 | 74.5 | 79.0 | 77.5 | 61.5 | 67.5 | 84.5 | 76.5 |
| Second solvent content/first solvent content | | 2.00 | 2.00 | 3.50 | 2.00 | 4.17 | 7.33 | 1.67 | 1.67 |
| Evaluation results | Storage stability | Viscosity variation | Good | Good | Good | Good | Good | Good | Bad | Bad |
| | | Particle size variation | Good | Good | Good | Good | Good | Good | Bad | Bad |
| | Bleeding | Bleeding | Good | Good | Good | Good | Good | Good | Good | Good |
| | Ejection Stability | Dot missing, deviation flaw | Good | Good | Good | Good | Good | Good | Good | Good |
| | Rub-fastness | | Good | Good | Good | Good | Good | Good | Good | Good |
| | Light fastness | Decrease in OD | Good | Good | Good | Good | Good | Good | Good | Good |

| | | Comparative Example 3 | Comparative Example 4 | Comparative Example 5 | Comparative Example 6 | Comparative Example 7 | Comparative Example 8 |
|---|---|---|---|---|---|---|---|
| Pigment (mass %) | C.I. Pigment Yellow 180 | 4.0 | | 4.0 | 4.0 | 4.0 | 4.0 |
| | C.I. Pigment Yellow 74 | | 4.0 | | | | |
| First solvent (mass %) | 1,2-hexanediol | 3.0 | 6.0 | 2.0 | 2.5 | 6.5 | 7.0 |
| | 1,2-pentanediol | | | | | | |
| Second solvent (mass %) | 1,3-dimethyl-2-imidazolidinone | 3.0 | | 3.0 | 3.0 | 6.5 | 7.0 |
| | N,N'-dimethylpropyleneurea | | | | | | |
| | 2-pyrrolidone | 4.5 | 7.0 | 4.0 | 3.0 | 6.5 | 7.0 |
| | N-methyl-2-pyrrolidone | | | | | | |
| Other solvent (mass %) | Glycerol | 5.0 | | | | | |
| Silicon surfactant (mass %) | polyether-modified siloxane | 0.5 | 0.5 | 0.5 | 0.5 | 0.5 | 0.5 |
| Resin dispersant (mass %) | Acrylic acid-acrylic ester copolymer | 1.0 | 1.0 | 1.0 | 1.0 | 1.0 | 1.0 |
| Resin particles (mass %) | Styrene-acrylic acid copolymer | 2.0 | 2.0 | 2.0 | 2.0 | 2.0 | 2.0 |
| Balance (mass %) | Ion exchanged water | 77.0 | 79.5 | 83.5 | 84.0 | 73.0 | 71.5 |
| Second solvent content/first solvent content | | 2.50 | 1.17 | 3.50 | 2.40 | 2.00 | 2.00 |
| Evaluation results | Storage stability | Viscosity variation | Good | Good | Good | Good | Bad | Bad |
| | | Particle size | Good | Good | Good | Good | Good | Bad |

| | | | | | | | | |
|---|---|---|---|---|---|---|---|---|
| Bleeding | variation Bleeding | Good | Good | Bad | Bad | Good | Good | |
| Ejection Stability | Dot missing, deviation | Good | Good | Good | Good | Good | Bad | |
| Rub-fastness | flaw | Bad | Good | Good | Good | Good | Good | |
| Light fastness | Decrease in OD | Good | Bad | Good | Good | Good | Good | |

In the aqueous ink compositions of Examples 1 to 6 shown in the Table, the variations of the viscosity and particle size were small. From these evaluation results, it was confirmed that the aqueous ink compositions of Examples 1 to 6 were superior in storage stability.

In addition, it was confirmed from the evaluation results of bleeding that the images formed with the aqueous ink compositions of Examples 1 to 6 on a plastic medium had superior characteristics against bleeding.

In the use of the aqueous ink compositions of Examples 1 to 6, the images exhibited small decreases in OD value. From these evaluation results, it was confirmed that the aqueous ink compositions of the Examples can form images superior in light fastness. Furthermore, the images formed with the aqueous ink compositions of the Examples were difficult to damage at the surfaces. From these evaluation results, it was confirmed that the aqueous ink compositions of the Examples can form images superior in rub-fastness. Furthermore, the aqueous ink compositions of Examples 1 to 6 did not easily cause dot missing or displacement of landing positions even in continuous printing. From these evaluation results, it was confirmed that the aqueous ink compositions of the Examples were superior in ejection stability.

In the aqueous ink compositions of Comparative Examples 1 and 2 shown, the ratio (W2/W1) of the second solvent content (W2) to the first solvent content (W1) was less than 2, as shown in the Table. Accordingly, these aqueous ink compositions were inferior in storage stability.

The aqueous ink composition of Comparative Example 3 contained glycerol. Accordingly, the resulting image was inferior in rub-fastness.

The aqueous ink composition of Comparative Example 4 did not contain C. I. Pigment 180 as the pigment. Accordingly, the resulting image was inferior in light fastness.

In the aqueous ink compositions of Comparative Examples 5 and 6, the first solvent content was less than 3% by mass. Accordingly, bleeding occurred in the resulting images in the bleeding test, and good images were not formed.

In the aqueous ink composition of Comparative Example 7, the first solvent content was more than 6% by mass. Accordingly, the viscosity was increased in the storage stability test, and the aqueous ink composition was inferior in storage stability.

In the aqueous ink composition of Comparative Example 8, the first solvent content was more than 6% by mass. Accordingly, the viscosity was increased in the storage stability test, and a lot of dot missing and deviation occurred in the ejection stability test. This aqueous ink composition was inferior in storage stability and ejection stability.

The invention is not limited to the above-described embodiments and Examples, and various modifications may be made. For example, the invention includes substantially the same form as the disclosed embodiments, for example, a form including the same method and producing the same result or a method having the same intent and producing the same effect. Some elements unessential to the form of the disclosed embodiment may be replaced. The form of an embodiment of the invention includes an element producing the same effect or achieving the same object, as the form of the disclosed embodiment. The forms of the disclosed embodiments may be combined with a known art.

What is claimed is:

1. An aqueous ink composition used in an ink jet recording method, the aqueous ink composition comprising:
    a pigment containing C. I. Pigment Yellow 180;
    a first solvent having a content, W1, of 3% to 6% by mass containing at least one of 1,2-hexanediol and 1,2-pentanediol; and
    a second solvent having a content, W2, of 6% to 25% by mass, and the second solvent containing at least one solvent selected from the group consisting of 2-pyrrolidone, N-methyl-2-pyrrolidone, N,N'-dimethylpropyleneurea, 1,3-dimethyl-2-imidazolidinone, tetramethylurea, dimethyl sulfoxide, and hexamethylphosphoric acid triamide,
wherein the aqueous ink composition does not contain glycerol, and the ratio W2/W1 is 2 to 8, and wherein the aqueous ink composition has a viscosity change after storage at −20° C. for 3 days and then further stored at 20° C. for about 4 hours, that varies in the range of more than −0.3 mPa·s and less than 0.3 mPa·s relative to the viscosity of the aqueous ink composition before storage.

2. The aqueous ink composition according to claim 1, wherein the ink jet recording method includes ejecting droplets of the aqueous ink composition onto an ink-non-absorbent or ink-low-absorbent recording medium from an ink jet recording apparatus, and drying the aqueous ink composition on the recording medium by heating the recording medium to 40° C. or more.

3. The aqueous ink composition of claim 1, wherein the aqueous ink composition contains 1% to 10% by mass of the pigment.

4. The aqueous ink composition of claim 1, wherein the aqueous ink composition has a viscosity of 2 to 10 mPa·s at 20° C.

* * * * *